United States Patent
Faust et al.

[11] 3,826,002
[45] July 30, 1974

[54] DENTURES AND TEETH FOR DENTURES AND METHODS OF MAKING THE SAME

[76] Inventors: Henry H. Faust, 319 E. First St.; Peter J. Faust, 1800 Rickety Ln., both of Tyler, Tex. 75701

[22] Filed: Sept. 22, 1972

[21] Appl. No.: 291,300

[52] U.S. Cl............................................ 32/2, 32/8
[51] Int. Cl............................................ A61c 13/00
[58] Field of Search...................................... 32/218

[56] References Cited
UNITED STATES PATENTS
2,577,769  12/1951  Kane...................................... 32/2
3,104,465  9/1963  Schackelford............................ 32/2

Primary Examiner—Robert Peshock

[57] ABSTRACT

Teeth for dentures having shock absorbing and cushioning agents incorporated therein and dentures made from such teeth, providing a yieldable resilient cushioning support for a hard occlusal biting surface on the teeth for minimizing the shocks of chewing and preventing or relieving destruction of underlying tissues and bone formations beneath the dentures. The posterior teeth are formed with a resiliently mounted movable hard occlusal surface which yields under biting pressure to stablilize the denture plate base and prevent shifting thereof from proper centric position on the support ridges of the mouth of the wearer.

16 Claims, 13 Drawing Figures

PATENTED JUL 30 1974 3,826,002
SHEET 1 OF 2
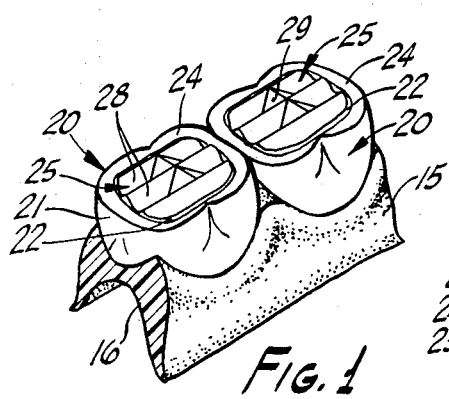
Fig. 1
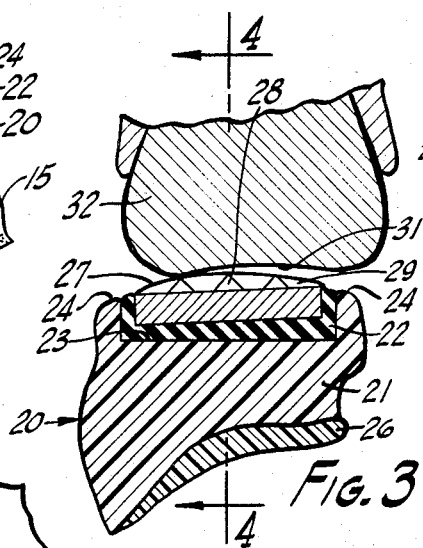
Fig. 2
Fig. 3
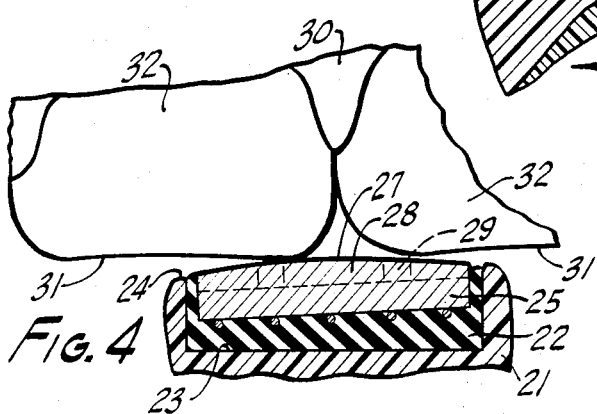
Fig. 4
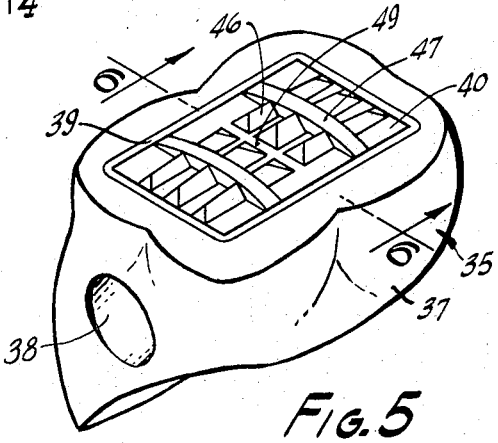
Fig. 5
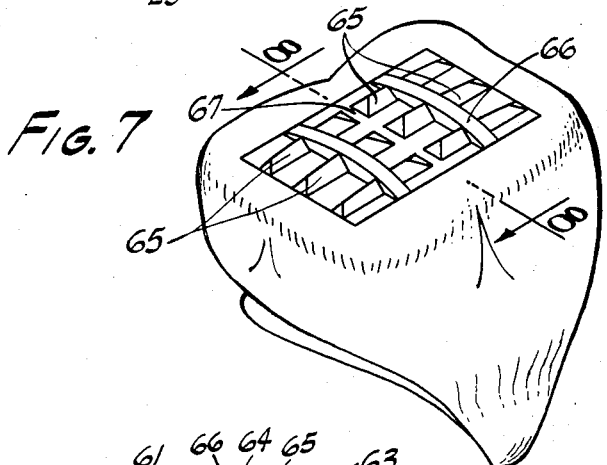
Fig. 7
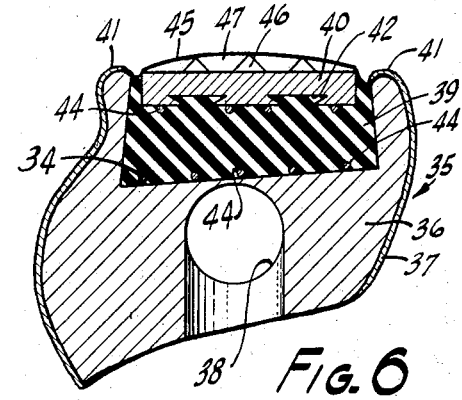
Fig. 6
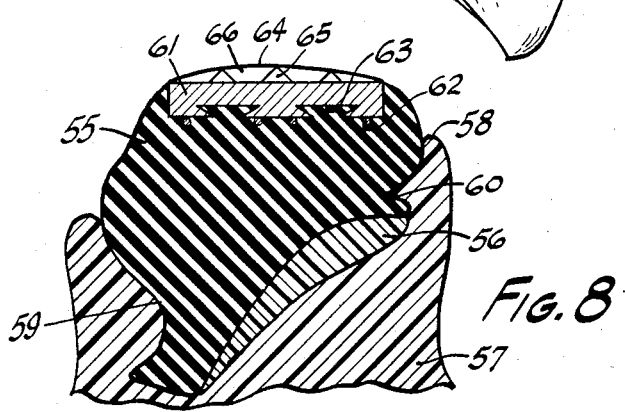
Fig. 8

PATENTED JUL 30 1974 3,826,002
SHEET 2 OF 2
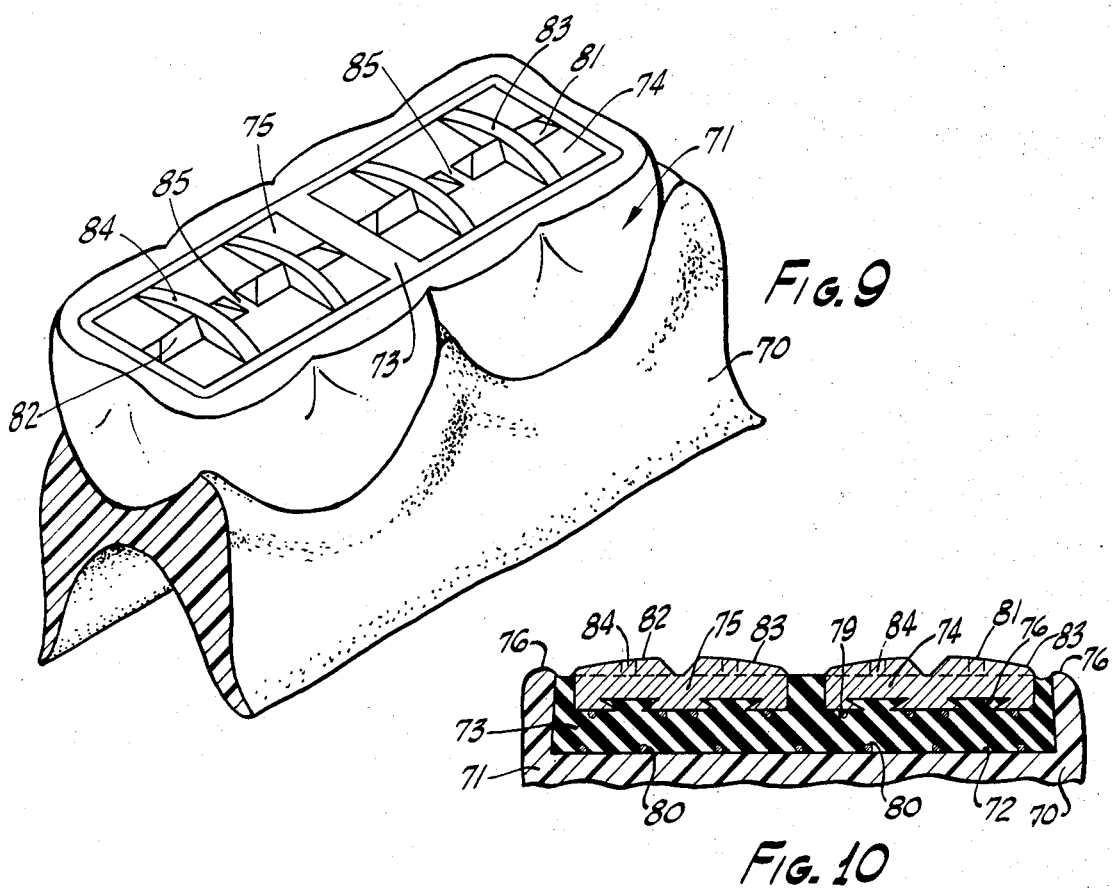
Fig. 9
Fig. 10
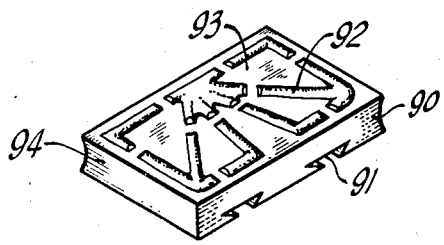
Fig. 11
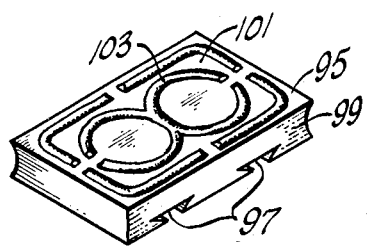
Fig. 12
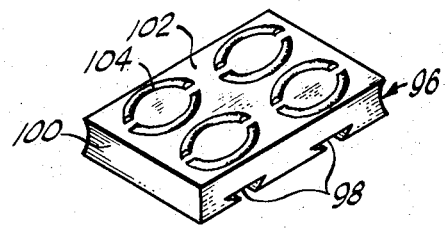
Fig. 13

DENTURES AND TEETH FOR DENTURES AND METHODS OF MAKING THE SAME

SUBJECT MATTER AND NATURE OF THE INVENTION

This invention relates to a new and useful improvements in dentures and teeth for dentures and to methods of making the same.

One object of the invention is to provide a new and improved denture tooth and dentures having such teeth incorporated therein.

A particular object of the invention is to provide an improved posterior tooth for use in dentures and a denture having such posterior teeth incorporated therein, wherein the teeth are formed with a movable hard occlusal biting surface member mounted in a body of cushioning material which is yieldable under forces of biting and chewing for cushioning such forces to stabilize the denture base on which the teeth are mounted and prevent its shifting away from the proper centric position in the mouth of the wearer.

An important object of the invention is to provide a new and improved denture tooth having a body of resilient plastic or elastomeric material supporting a hard occlusal surface member in position for engagement with the opposing natural or artificial teeth.

A further object of the invention is to provide a denture tooth having a body which is adapted to be secured to the usual hard plastic material of the base plate of the denture, a mass of resilient plastic or elastomeric material supported by the tooth body and an occlusal cutting surface member formed of metal, enameled or veneered metal, porcelain, or the like, disposed to engage and substantially operatively conform to the occlusal faces of the opposing natural or artificial teeth of the wearer of the denture.

A particularly important object of the invention is to provide a denture tooth wherein a hard occlusal cutting surface member is disposed on a body or mass of cushioning material carried by the tooth body to provide for yieldable resilient movement in all directions of the biting occlusal surface member of the tooth, and so to provide a tooth functioning in a similar manner to the natural teeth supported by cushioning fibers of the natural jaw between the teeth and the bone of the natural jaw.

A further object of the invention is to provide an artificial tooth for use in a denture having a body, a resilient cushioning member supported by the body, and a hard occlusal biting surface member supported by the resilient member for movement with respect to the body, whereby the occlusal surface of the tooth is movable with respect to the body and with respect to the denture base in which the tooth is incorporated as a part.

A further object of the invention is to provide a tooth of the character set forth wherein the hard occlusal biting surface of the tooth has a substantially convex protuberant plurality of cutting members thereon.

BRIEF DESCRIPTION OF THE DRAWINGS

Additional objects and advantages of the invention will be readily apparent from the reading of the following description of a device constructed in accordance with the invention, and reference to the accompanying drawings thereof, wherein:

FIG. 1 is a fragmentary isometric view of a denture showing a pair of posterior teeth constructed in accordance with the invention incorporated therein;

FIG. 2 is a fragmentary side elevation of the teeth of the denture of FIG. 1 showing the same in position to coact with the upper natural or artificial teeth of the wearer of the denture;

FIG. 3 is an enlarged fragmentary cross-sectional view taken on the line 3—3 of FIG. 2 showing the construction of the tooth of the invention;

FIG. 4 is an enlarged fragmentary vertical sectional view taken along the mesial-distal axis of one of the teeth of FIG. 3;

FIG. 5 is an enlarged isometric view of a modified form of the tooth of the invention;

FIG. 6 is an enlarged fragmentary view taken on the line 6—6 of FIG. 5 along the buccal-lingual axis of the tooth;

FIG. 7 is a view similar to FIG. 5 showing a further modified form of the tooth;

FIG. 8 is an enlarged cross-sectional view taken on the line 8—8 of FIG. 7 along the buccal-lingual axis of the tooth and showing the same mounted in a denture base plate;

FIG. 9 is an enlarged fragmentary isometric view of a denture showing a unitary pair of teeth constructed in accordance with the invention mounted on a denture base plate;

FIG. 10 is a fragmentary vertical sectional view of the teeth of FIG. 9 taken along the mesial-distal axis of the teeth;

FIG. 11 is an enlarged isometric view of a modified form of hard occlusal cutting surface member for incorporation in the teeth;

FIG. 12 is a view similar to FIG. 11 of a further modified form of hard occlusal cutting surface member; and, FIG. 13 is an isometric view of still another modified form of the hard occlusal cutting surface member for use in the teeth.

DESCRIPTION OF THE INVENTION

As is well known, the natural teeth of the human animal are supported in sockets in the mandible or maxilla by a plurality of cushioning fiber members which join the root of the tooth to the bone in the socket in which the tooth is disposed. The cushioning fibers provide a yieldable support for the teeth in the socket to absorb or cushion the biting forces when the teeth are in use, to reduce the transmittal of shock from the teeth to the bone during the biting operation.

Dentures, especially the lower full denture, frequently are caused to fit badly because of the destruction of the underlying tissues and bone formations due to movement or shifting of the lower denture on the ridges when chewing foodstuffs. The shock or trauma of chewing causes the base plate of the denture to move laterally or anteriorly-posteriorly on the bone support ridges, and therefore causes destruction and deterioration of the ridges and loss of stability and fit of the dentures on the mouth structures.

This invention has to do with the provision of teeth having movable shock absorbing mechanism for supporting the hard movable occlusal biting surface of a tooth on the base plate of the denture, so that the occlusal biting surfaces may resiliently move or yield to the forces of chewing or biting during such operation.

Thus, the movable occlusal surface provides for absorbing the shock or trauma of the forces applied to the occlusal surface of the teeth in the denture, and permits the denture base to remain stationary on the ridges of the wearer of the denture during the chewing operation, and thus reduces or prevents destruction or deterioration of the valuable support ridges.

In the drawings, FIG. 1 shows a fragmentary isometric view of a lower denture having a base plate 15 of the usual hard plastic material provided with a recess 16 in its underside which is constructed to fit the support ridge of the mandible of the wearer of the denture. Mounted on the base plate 15 are a plurality of posterior teeth 20 each of which includes a hard rigid body portion 21 formed of cast metal, or porcelain, or a metal veneered with porcelain or plastic, or a coated plastic. Each of the teeth also includes a resilient cushioning shock absorbing body or member 22 disposed in a socket or recess 23 in the upper portion of the tooth body 21 and supporting a hard metallic, porcelain, or porcelain or plastic veneered metal, hard occlusal cutting surface member 25 which is spaced from the bottom and the sides of the socket 23 by the body of resilient material 22 and yieldably supported above the upper edges 24 of the hard tooth body 21. A hard plastic bonding member or section 26 is formed on the lower portion of the body 21 for assuring that the tooth is secured in place in the plastic of the base member 15 of the denture. The upper surface 27 of the hard occlusal surface member 25 is provided with a plurality of projecting cutting members in the form of parallel elongate mesial-distal cutting members 28 and cross members 29 extending transversely of the elongate cutting members 28, and these cutting members provide for cutting food during the chewing operation. The upper cutting surface 27 of the hard occlusal cutting surface member 25 is preferably convexly formed so as to conform to the concave bottom section 31 of the teeth 32 of the upper denture 30. The substantially convex configuration extends in both the buccal-lingual direction and the mesial-distal direction.

As shown in FIG. 3, the upper convex surface 27 of the cutting members 25 will tilt in the resilient cushioning body 22 in the socket 23 of the tooth to permit absorption of stresses without causing movement of the tooth 20 and the denture base 15 on the tissue and bone ridges supporting the denture. Also, as is clearly shown in FIG. 4, the upper surface 27 of the hard occlusal surface member 25 will also flex in the mesial-distal direction on engaging the surfaces 31 of the opposing teeth during the chewing operation. Thus, the cutting surface members 25 flex in all directions during the chewing operation, the shock absorbing or cushioning resilient body 22 in the socket 23 of the body 21 of the teeth permitting such movement. The cutting members 28 and 29 of the teeth provide for cutting the food being chewed for proper mastication thereof.

It will be seen from the foregoing, that the tooth is provided with a cushioning member or body 22 which serves substantially the same function as the normal living cushion fibers between the teeth and the socket of the alveolar process or bone of the normal living tooth. Thus, the base 15 of the denture does not shift on the ridge and cause deterioration of the bone and tissue therebelow, as would otherwise be the case in the normal denture having rigid teeth.

A modified form of tooth is shown in FIG. 5, wherein a tooth 35 having a metal body 36 coated with an enamel or acrylic veneer 37 is provided with a diatorix type retaining means 38 in its underside for receiving the hard plastic of the denture base for retaining the tooth in place in the denture base. The recess 34 in the upper portion of the tooth receives the resilient cushioning body 39 which supports the metal or hard enamel occlusal cutting surface member 40 and supports the same in a projecting position above the upper edges 41 of the body of the tooth. The underside of the occlusal cutting member 40 is provided with dovetailed recesses 42 which receive the resilient cushioning material 39 for retaining the cutting surface member 40 in place. In additional, retention beads 44 may be provided on both the underside of the cutting surface member 40 and in the bottom of the recess 34 as shown in FIG. 6. The upper cutting surface 45 of the cutting surface member 40 is also convex and projects above the edges 41 of the body of the tooth, and is provided with cutting members 46 and 47 similar to the cutting members 28 and 29 of the form first described. Slots or gaps 49 are cut through the longitudinal or elongate mesial-distal cutting members 46 between the buccal-lingual cutting members 47 to permit food to escape that would otherwise accumulate in the pockets between the longitudinal cutting members 46 and the cross cutting members 47 on the upper surface of the occlusal surface member.

Otherwise, this form of the tooth has the same functions and advantages of the first described form, the resilient shock absorbing or cushioning body 39 permitting shifting of the occlusal cutting surface member 40 as the food is chewed.

A further modified form of tooth is shown in FIGS. 7 and 8 wherein the major portion of the tooth body 55 is formed of resilient plastic or elastomeric shock absorbing material. The underside of the body 55 of shock absorbing material is provided with a plastic bonding member 56 by means of which the tooth is fused, bonded or otherwise adhered to the base 57 of the denture. The shock absorbing body 55 projects above the upper surface 58 of the denture base 57 and retaining undercuts 59 and 60 formed on the opposite buccal-lingual sides of the tooth provide additional means for supporting the body of cushioning material 55 in the base member 57 of the denture. The hard occlusal cutting surface member 61 is similar to the cutting member 50 of the form last described, and is provided with retention beads 62 and dovetailed slots or grooves 63 on its underside for bonding the same more securely in the mass of cushioning material. The upper surface 64 of the cutting surface member 61 is also convex and provided with mesial-distal longitudinal cutting edge members 65 and buccal-lingual cross cutting members 66 and a slot 67 cutting the mesial-distal cutting blades 65 in the same manner as those of the form shown in FIGS. 5 and 6. The difference between this form of tooth and the preceding forms is that substantially the entire body of the tooth is formed of cushioning material 55 which may yield under chewing stresses. The resilient cushioning material may flex more readily than that of the forms previously described, but may be formed of a less flexible resilient plastic to limit such flexure. Otherwise, the tooth functions in the same manner as the forms previously described.

It is believed readily apparent that a set of more than one posterior or molar replacement tooth may be constructed as a unit in accordance with the invention. Such a combination is shown in FIG. 9, wherein the base plate of the denture 70 has a pair of teeth 71 secured therein. The teeth 71 are shown to conform to a double molar configuration and an elongated mesial-distal recess 72 is formed in their upper surface for receiving the resilient cushioning material 73 and supporting separate rigid hard occlusal cutting surface members 74 and 75 therein projecting slightly above the surface of the upper edges 76 of the teeth 71, as shown in FIG. 10. The cutting members 74 and 75 are provided with dove tails 76 and 77, respectively, in their undersides and retention beads 78 and 79 are secured to the underside of the occlusal cutting members in the same manner as those first described for providing additional retention of the cutting members in the body of the cushioning material. Additional retention beads 80 may be disposed in the bottom of the recess for assisting in retaining the cushioning material in place in the recess 72. The upper surfaces 81 and 82 of the cutting members are convex and provided with longitudinal and transverse cutting members 83 and 84, respectively. Slots 85 are cut in the longitudinal mesial-distal cutting members, as clearly shown in FIGS. 9 and 10. This combination or doublet type of tooth permits the construction of a denture having a pair of cutting surfaces or occlusal cutting surface members mounted therein for a more ready absorption and cushioning of the shock in chewing. It also permits a more substantial construction of the teeth, and facilitates packing the teeth in a denture base cast. It is also believed obvious that the doublet or multiple tooth may be formed with a plurality of sockets in its upper surface portion for receiving a plurality of a separate body of cushioning material and a plurality of separate occlusal cutting surface members. Also, more than two teeth may be combined into the set or unit.

FIGS. 11, 12 and 13 show slightly modified forms of the hard occlusal cutting surface members used in the teeth. In FIG. 11, the cutting member 90 has dovetailed slots in its underside and is provided with a plurality of irregular projecting cutting surfaces 92 on its upper surface 93. Also, the sides 94 of the occlusal cutting surface member are concave to provide for better retention of the cutting member in the body of cushioning material in the teeth. FIGS. 12 and 13 show cutting members 95 and 96, respectively, each of which has dovetailed grooves 97 and 98, respectively, in its undersurface and concave side walls 99 and 100, respectively, for providing better retention of the cutting member in the body of cushioning material. The upper surfaces 101 and 102 of the occlusal cutting surface members are provided with projecting cutting chewing members 103 and 104, respectively, of different configuration from those previously described. It is believed readily apparent that the hard occlusal cutting surface members may be provided with undercut sides, dovetail grooves, retention beads and various forms of cutting surfaces on its upper cutting edge to provide the desired cutting action in use.

It will also readily be seen that each of the teeth described is provided with a body of cushioning material which permits the occlusal cutting surface member to move with respect to the base portion or body portion of the tooth and the base of the denture which supports the teeth. Thus, the cutting surface member may shift during the chewing action, as shown in FIGS. 3 and 4, to absorb the shock of chewing or biting without causing the denture to shift on the ridges on which it is supported in the wearer's mouth.

While it is most desirable that the teeth, be provided in the lower denture for use on the mandible, it is readily apparent that similar construction may be employed in the upper denture for use on the maxilla of the wearer. Ordinarily, however, the upper denture is more firmly supported against movement in the mouth of the wearer and the deterioration or destruction of the bone or tissue ridges of the maxilla is not as likely to occur as is that of the ridges of the mandible. It is also apparent that the teeth may be used in all posterior teeth of the denture to provide for the cushioning action.

The materials of which the body of the teeth having the socket therein may be formed are a hard plastic, such as a vinyl acrylic which is well known in the art. Also, the bodies may be formed of metal, or metal coated with acrylic, or metal having porcelain or acrylic veneer, or any other suitable material. The body of cushioning material may be a fluorocarbon, nylon, or other thermoplastic, butadiene and styrene polymerized with methyl methacrylate, elastomeric silicone, polyurethane, or any other permanently resilient plastic material, one type of which is commonly known under the trade name "Flexiplast," a plastic material which does not harden and remains permanently resilient. The resilient cushioning material may be selected to produce the desired resistance to flexure and yet provide sufficient resiliency for absorption of the shocks of chewing. The base plate of the dentures is made of the usual hard plastic material, such as methyl methacrylate, or any other desirable suitable material to which the resilient cushioning material may be bonded or fushed. The hard occlusal cutting surface members may be made of any desirable bite resistant material, such as metal, metal coated with enamel, or porcelain veneer or the like. Any retention means may be utilized for holding the body of shock absorbing or cushioning material in the sockets of the teeth, and for holding the cutting surface members in place on the body of the cushioning material.

The foregoing description of the invention is explanatory only, and changes in the details of the construction illustrated may be made by those skilled in the art, within the scope of the appended claims, without departing from the spirit of the invention.

What is claimed and desired to be secured by Letters Patent is:

1. A denture comprising: a denture base; a plurality of artificial teeth including posterior teeth formed of a body member fixedly secured on said denture base; a body of resilient supporting means on said body member and having a base portion secured to said body member and an opposed surface portion exposed laterally about its edges inwardly from said body member; and occlusal cutting surface means movably mounted on said resilient supporting means and having exposed cutting surface means projecting beyond the exposed surface of said resilient supporting means and having its lateral edges spaced from said body member and disposed to engage opposing natural or artificial teeth; said spacing of said exposed occlusal cutting surface means laterally from said body member permitting said resilient supporting means to resiliently support said movable occlusal cutting surface means for lateral movement, tilting and compressive yieldable movement of said occlusal cutting surface means with respect to said body member.

2. A denture of the character set forth in claim 1 wherein said body member has a socket opening toward the occlusal surface area of said body member; said body of resilient supporting means is confined in said socket with said opposed surface section exposed in said opening of said socket; and said occlusal cutting surface means is supported on the exposed surface the body of resilient supporting means spaced from the body member portion defining the opening of the socket in said body member and said occlusal cutting surface means is movable laterally and longitudinally and tiltably with respect to said body member, whereby said body of resilient material cushions movement of the cutting surface means relative to the said body member to accomodate stresses of chewing.

3. A denture of the character set forth in claim 1 wherein the body member comprises a multiple tooth main body unit having means for securing it to said base member of the denture and a recess therein opening toward the occlusal surface area of said body unit; said body of resilient material is secured in said recess in said body unit with said opposed surface section exposed in the opening of said recess; and said occlusal cutting surface means has a cutting surface on its exposed surface projecting from said recess in said main body unit and is spaced laterally from the portion of said main body unit defining the opening of said recess whereby said cutting surface means is movably supported by said body of resilient material for lateral and tilting movement with respect to the main body unit as a result of engagement of said cutting surface with opposing teeth.

4. A denture of the character set forth in claim 3 wherein the occlusal cutting surface means comprises a plurality of separate members each having a cutting surface on its exposed surface spaced laterally from the other members and from the main body portion having the opening of the recess in said main body with the cutting surface of each member projecting from the body of resilient material and from the opening of said recess to engage opposing teeth, said resilient material permitting each member to undergo independent lateral, tilting and compressive movement with respect to the main body unit.

5. A denture of the character set forth in claim 1 wherein said plurality of posterior teeth comprises; a plurality of separate main body members each having a socket in its exposed surface area opening toward the occlusal surface area of the tooth; said resilient supporting means comprises a body of resilient cushioning material confined in said socket of each body member with the opposed surface section thereof exposed in said opening of said socket; and said cutting surface means comprises a hard occlusal cutting surface member secured in and supported on the body of resilient cushioning material in each said socket and spaced laterally inwardly from the portion of the body member defining the opening of said socket, each cutting surface member having a cutting surface projecting from said socket for engagement with an opposing tooth; said resilient cushioning material permitting said cutting surface member to undergo tilting, lateral and compressively yieldable movement of the cutting surface member relative to the main body member to absorb and cushion the stresses and forces of eating.

6. A denture of the character set forth in claim 5 wherein the exposed occlusal cutting surface of each hard occlusal cutting surface member is provided with a plurality of projecting cutting members disposed to engage the occlusal surface of the opposing natural or artificial teeth of the wearer of the denture for masticating food therebetween, said cutting members having means providing for free movement of the food particles along the exposed surface after the same have been cut.

7. An artificial tooth for use in the posterior portion of a denture comprising: a main body having means for securing it to the base plate of a denture; a body of resilient cushioning material having a base portion fixedly secured to and supported by the main body of the tooth and having an opposed exposed surface portion spaced laterally about its edges inwardly from said main body; and a hard occlusal cutting surface member movably supported on and secured to the exposed surface portion of the body of resilient cushioning material and having lateral edges spaced laterally inwardly from said main body; said cutting surface member having an exposed occlusal cutting surface projecting from the exposed surface of the body of resilient cushioning material and disposed to engage the occlusal surface of opposing teeth, said resilient cushioning material and the spacing of the cutting surface member from the main body permitting said cutting surface member to tiltably, laterally and compressively yieldably move with respect to the main body of the tooth and the base of the denture during chewing movements to absorb and cushion the stresses and forces of chewing.

8. An artificial tooth for use in a denture comprising: a main body; means on the main body for securing the main body to a denture; a body of resilient cushioning material having a base portion and an opposed surface portion; means on the main body for receiving and supporting the base portion of said body of resilient cushioning material with the surface portion thereof exposed; and a rigid hard occlusal cutting surface member secured to and supported on the exposed surface portion of the body of cushioning material with its edges spaced laterally from so as to be movable on said resilient cushioning material with respect to said main body; said cutting surface member having an occlusal cutting surface disposed to project from the exposed surface portion of said cushioning material beyond said main body to be positioned in the occlusal plane of a denture in which the tooth is incorporated, said resilient materials and the spacing of said cutting surface member from said main body providing for tilting, lateral said compressive movement of said cutting surface member with respect to said main body.

9. A tooth of the character set forth in claim 8 wherein the rigid hard occlusal cutting surface member is provided with a plurality of projecting cutting members on its exposed occlusal surface.

10. An artificial tooth of the character set forth in claim 8 hwerein the tooth main body comprises a multiple tooth unit.

11. A method of making an artificial tooth comprising: forming a tooth body portion having a recess therein opening toward the occlusal surface area of the tooth body; securing a body of resilient cushioning material in the recess in the tooth body; forming a hard occlusal biting surface member; securing the occlusal biting surface member in the body of cushioning material with the occlusal biting surface thereof projecting from the cushioning material and the recess in the tooth body; and spacing the occlusal biting surface member laterally inwardly from the tooth body at the opening of the recess of the tooth body so as to be tiltably, laterally and compressively movable with respect to the tooth body on said body of cushioning material.

12. A method of making an artificial tooth comprising: forming a tooth member of a body of resilient cushioning material having an underside and an exposed surface portion; forming a securing member on the underside of the tooth member; securing a hard occlusal cutting surface member to the exposed surface portion of the tooth member opposite the securing member with a portion of said cutting surface member projecting from the exposed surface portion of the cushioning material to form an occlusal cutting surface on the tooth member movable tiltably, laterally and compressively with respect to said securing member.

13. A method of making a tooth of the character set forth in claim 11, including forming said tooth body portion as a multiple tooth unit.

14. A method of making a tooth of the character set forth in claim 13 including: securing a plurality of separate biting surface members on the cushioning material in the multiple tooth body.

15. A method of making dentures which includes: forming a tooth body portion having a base and an occlusal surface portion, said tooth body portion having a recess therein opening toward the occlusal surface of the tooth body portion; securing a body of resilient cushioning material in the recess in the tooth body portion with a surface portion exposed in the opening of the recess; securing a hard occlusal biting surface member in the exposed surface portion of the body of cushioning material with the occlusal biting surface thereof projecting beyond the exposed surface portion of the cushioning material and from opening of the recess in the tooth body portion and spaced laterally inwardly from the tooth body portion defining the opening of said recess to be movable freely laterally, tiltably and compressively with respect to the tooth body portion on said body of cushioning material; forming a hard plastic denture base; and fusing the base of said tooth body portion of said denture base in a posterior position.

16. An artificial tooth of the character set forth in claim 10 wherein the occlusal cutting surface means comprises a plurality of separate cutter members each independently secured in the body of cushioning material spaced from each other and from the main body and movable with respect to each other and with respect to the multiple tooth unit.

* * * * *